April 16, 1935.
H. T. HUNTER
Re. 19,535
COOKING APPARATUS
Original Filed Oct. 31, 1930 2 Sheets-Sheet 1
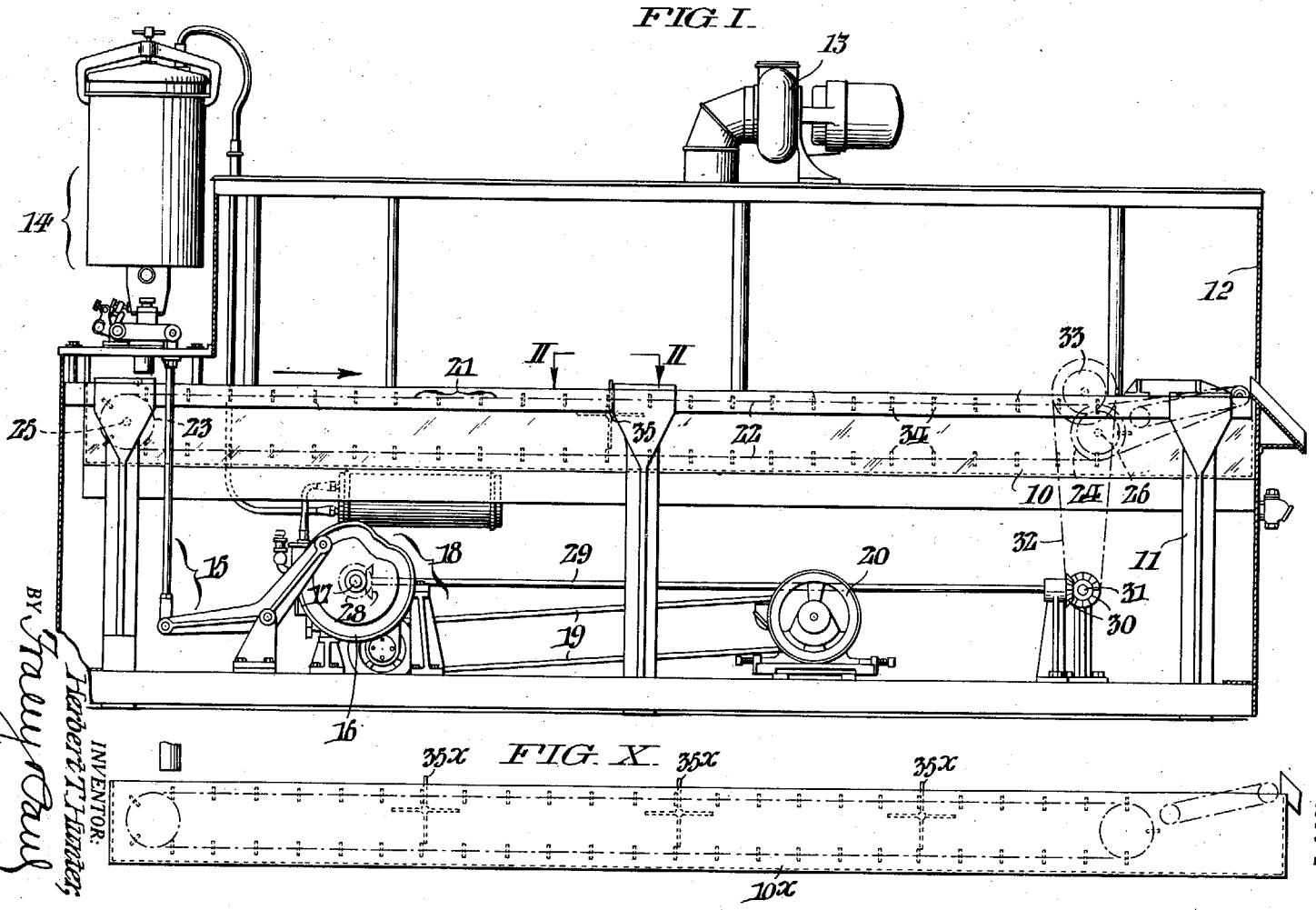

April 16, 1935.
H. T. HUNTER
Re. 19,535
COOKING APPARATUS
Original Filed Oct. 31, 1930 2 Sheets-Sheet 2
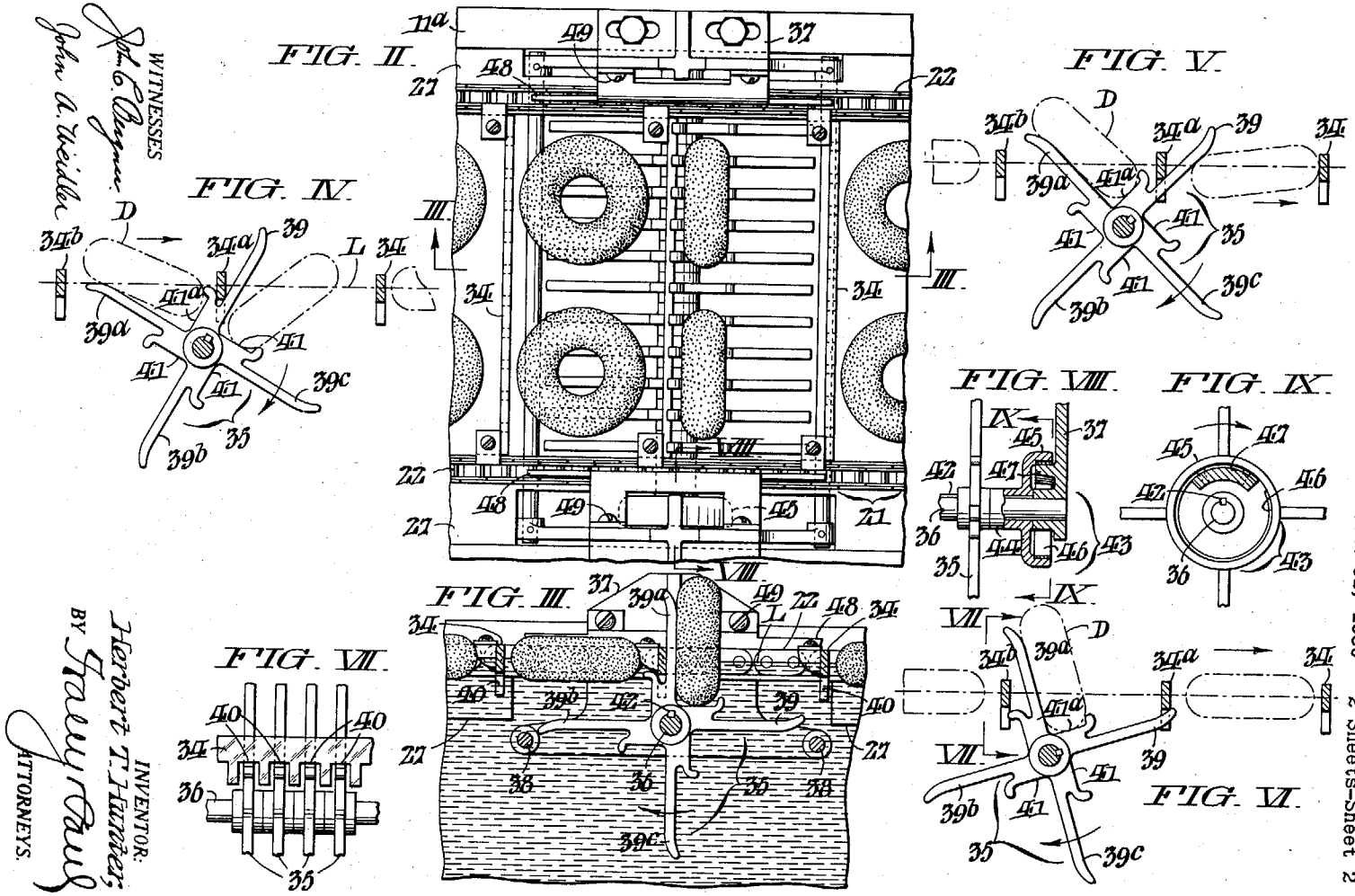
WITNESSES
John C. Bergner
John A. Weidler
INVENTOR:
Herbert T. Hunter,
BY Fraser & Paul
ATTORNEYS.

Reissued Apr. 16, 1935 Re. 19,535

UNITED STATES PATENT OFFICE 19,535

COOKING APPARATUS

Herbert T. Hunter, Baltimore, Md., assignor to Doughnut Corporation of America, New York, N. Y., a corporation of New York Original No. 1,965,241, dated July 3, 1934, Serial No. 492,402, October 31, 1930. Application for reissue October 6, 1934, Serial No. 747,197

29 Claims. (Cl. 53—7)

This invention relates to apparatus for automatically cooking doughnuts and the like, and has reference more particularly to doughnut machines of the kind disclosed in Patent No. 1,823,146, granted to me on September 15, 1931.

In former cooking apparatus of the type referred to, raw doughnuts are dropped successively into one end of an elongated receptacle containing hot cooking liquor, and advanced therealong definitely separated and afloat in the liquor, by a cellular progressing conveyor. After progression in the liquor afloat on one side through substantially half the length of the receptacle, the doughnuts are successively turned over by an intermittently operated flipping device and at the same time transferred individually from the cells of the progressing conveyor aforesaid to the cells of a second progressing means similar to the first mentioned, whereby the doughnuts are successively advanced, again in definite separation, but afloat in the liquor at this time on their other sides, to the opposite end of the machine, and finally ejected from the apparatus fully cooked. Aside from being in itself complicated, the flipping device aforesaid requires considerable space for its accommodation between the two sections of the progressing conveyor, thereby adding to the length of the cooking receptacle and entailing the heating of a corresponding excess of cooking liquor. The flipping turn-over also necessitates intricate actuating mechanism which must be accurately timed with the movement of the two conveyor sections cooperating with it.

The main object of my invention is to obviate the recited drawbacks of previous practice in this art which end I attain, as hereinafter fully set forth, through provision of a simple and reliable turnover means capable of operation in conjunction with a single continuously-moving progressing conveyor, and moreover capable of being actuated by the said single conveyor without the aid of interposed means requiring timing, to turn over the individual doughnuts.

A further object of my invention is to secure the above indicated desideratum in a turn-over which is capable of inverting the doughnuts within the same cells into which they were initially introduced by the forming means of the cooking apparatus, i. e. without necessitating transfer of the doughnuts from one cell to another of the conveyor.

Other objects and attendant advantages will be manifest from the detailed description following in coordination with the attached drawings, whereof Fig. I is a side elevation of an automatic doughnut cooking apparatus conveniently embodying my invention, the casing of the machine having been shown in section to expose the parts at the interior.

Fig. II is a fragmentary plan view of the cooking receptacle of the apparatus, taken as indicated by the arrows II—II in Fig. I, and showing my improved turnover means on a larger scale.

Fig. III is a fragmentary longitudinal sectional view taken as indicated by the arrows III—III in Fig. II.

Figs. IV, V and VI are diagrammatic views showing successive positions of the turnover means incident to inverting a doughnut.

Fig. VII is a fragmentary detail sectional view taken as indicated by the arrows VII—VII in Fig. VI.

Fig. VIII is a detail sectional view taken as indicated by the arrows VIII—VIII in Fig. II showing the details of a brake means associated with the turnover means.

Fig. IX is a detail sectional view taken as indicated by the arrows IX—IX in Fig. VIII; and, Fig. X is a diagrammatic view showing a modification of my invention.

The doughnut machine illustrated in Fig. I is generally similar to that featured in my patent hereinbefore referred to, its elongated cooking receptacle being indicated at 10 and shown as supported at a convenient height from the floor by a sub-frame 11. The receptacle 10 is enclosed by a sheet metal casing 12 from which the fumes are drawn off at the top by a motor driven suction blower 13. A forming device, comprehensively designated by the numeral 14, successively releases raw doughnuts, in this instance pairs of them, to drop side by side into one end of the receptacle 10 which is kept filled with cooking liquor up to the level L in Fig. III. This forming means 14 is intermittently actuated, through a system 15 of levers and links, by a rotary cam 16 on the shaft 17 of a speed reducing mechanism 18 within the enclosure 12 beneath the receptacle 10. As shown, the speed reducing mechanism 18 is driven through a belt connection 19 by an electric motor 20. Raw doughnuts, successively dropped into the cooking receptacle 10 as aforesaid, are advanced along the latter in the direction of the arrow in Fig. I by a progressing conveyor 21 having the form of a single endless conveyor which is substantially co-extensive in length with the receptacle 10. From Fig. II it will be noted that the conveyor 21 comprises a pair of side chains 22, which are trained over sprocket wheels 23, 24 on shafts 25, 26 rotating in suitable bearings (not shown) near opposite ends of the receptacle 10 submerged in the cooking liquor L. The upper and lower runs of the chains 22 are sustained against sagging by tracks such as shown at 27 in Fig. III secured along opposite side walls of the receptacle 10. The progressing conveyor 21 is continuously moved at a slow rate of speed by power derived from the shaft 17 of the speed reducing mechanism 18, through a transmission which includes bevel gearing 28 coordinating a line shaft 29 from which the power is transmitted by means of a second set of bevel gears 30 to a transverse shaft 31. The motion of this transverse shaft 31 is communicated in turn, through a sprocket chain 32 and spur gearing 33, to the shaft 26 of the sprocket wheels 24 serving the conveyor chains 22. Barrier bars 34 extending transversely of the sprocket chain 22 at equally spaced points, set apart a series of cells for receiving the individual pairs of the doughnuts D and for maintaining them in definite separation incident to progression in the liquor L.

The novel turnover means with which this invention is in part concerned, has, as shown in Figs. I–VI, the form of a rotor 35 which is adapted to be over-travelled by the upper run of the conveyor 21 and to be actuated by the barrier bars 34 of the latter. This rotor 35 extends transversely of the cooking receptacle 10 in the present instance, about midway of the length of the same, its shaft 36 being supported for rotation submerged in the cooking liquor L by drop brackets 37 which are bolted, with capacity for positional adjustment, to the upper longitudinals 11a of the machine frame 11. As shown in Figs. II and III, the drop brackets 37 are connected by a pair of transverse tie rods 38 with formation of an assemblage capable of being removed as a unit from the machine together with the rotor 35. It will further be noted from Fig. II that the rotor 35 embodies a number of duplicate components 39 of spider-like configuration each having four curve ended radial fingers which collectively form doughnut engaging means 39, 39a, 39b and 39c of a length to project into the path of the barrier bars 34 of the progressing conveyor 21, the lower edges of said bars being notched, as at 40 in Figs. III and VII, for passage of said fingers. At their roots, the fingers 39, 39a, 39b and 39c, are formed with heels 41 that collectively constitute rests to support the doughnuts D on edge incident to turning in a manner more fully explained later. Referring again to Figs. II and III, the hubs of the rotor components 39 are slotted to engage a key 42 on the shaft 36, said components being thereby secured against relative movement on the shaft 36. The hubs of the components 39 have substantial projection in opposite directions and thus predetermine uniform spacing of said components, as shown in Fig. II, when abutted against each other in the assemblage. To yieldingly restrain the rotor 35, I provide a brake means 43 including a collar 44 secured to the shaft 36, as best shown in Figs. VIII and IX. This collar 44 has integrally formed with it a brake drum flange 45 whereof the inner circumferential surface is adapted to coact with a split spring band 46 secured at one end of a segmental projection 47 of the contiguous bearing bracket 37. The brake drum collar 44 is slotted to engage the same key 42 on the shaft 36 serving the spider-like components 39 of the rotor 35. While it is possible to construct the rotor 35 as a casting in one piece, the described composite arrangement is preferred since it enables ready removal and replacement of any broken sections at small expense as compared to that which would be entailed by replacement of the rotor 35 in its entirety. To prevent lifting of the upper runs of the conveyor chains 22 in the region of the rotor 35, I provide hold-down shoes 48 to engage said chains, such shoes being secured to the brackets 37 by screws 49 as shown in Figs. II and III.

The operation of my improved cooking apparatus as embodied in Figs. I–IX is as follows: The raw doughnuts D successively released by the forming device 14, drop into the cells of the progressing conveyor 18 between the cross bars 34 and are thereby maintained in definite separation incident to progression in the cooking liquor L. As the doughnuts D reach the rotor 35, they are successively inverted within the confines of the same conveyor cells into which they were originally placed, and float on their other sides in the cooking liquor L incident to further progression in the apparatus. The manner in which the rotor 35 is actuated to perform the function just described will be best understood by reference to Figs. III, IV, V and VI. In Fig. IV the upstanding fingers 39 of the rotor 35 are engaged by the barrier bar 34a of the progressing conveyor 21 with impartation of clockwise rotation. As the rotation continues, the immediately following fingers 39a engage a pair of doughnuts D from beneath, as shown in Fig. IV, and gradually lift them angularly from the liquor L. Incidentally, the doughnuts D are prevented from slipping forward by the heels or rests 41a associated with the fingers 39a. As the rotation proceeds still further, the doughnuts D are gradually elevated through the position of Fig. V to the nearly vertical position of Fig. VI, the movement of the rotor 35 decelerating due to approach of the barrier bar 34a toward the tips of the rotor fingers 39. With the doughnut D in the position of Fig. VI, there is a slight dwell of the rotor 35 due to movement of the conveyor bar 34a beyond the ends of the fingers 39 before engagement takes place between the succeeding conveyor bar 34b and the fingers 39a. This dwell of the rotor 35 is important in that it precludes premature falling over of the doughnuts D and their likelihood of fouling the receding conveyor bar 34a. When the bar 34b finally engages the fingers 39a, the movement of the rotor 35 is accelerated due to contact of the said bar with the fingers 39a closer to the center of the rotor axis. As a consequence of such quickened movement the doughnuts D, while sustained on edge by the heels 41a associated with the fingers 39a, are thrown over concurrently with passage of said fingers through the vertical position of Fig. III, and redeposited inverted for further progression in the cooking apparatus afloat on their opposite sides. In this connection it is important to note that the inversion of the doughnuts D takes place within the same cell of the conveyor 21 into which they were initially introduced by the forming means 14. After turning of a pair of doughnuts D, in the manner just explained, the rotor fingers 39, 39a, 39b and 39c, by virtue of being rounded at their ends, gradually clear the turned doughnuts D by a receding or feathering action in a manner obvious from Figs. V and VI. The function of imparting movement to the rotor 35 is shared successively by the several fingers 39, 39a, 39b and 39c, such movement being substantially continuous and subject to the yielding restraint of the brake means 43 with prevention of independent rotation or "overbanking" of the rotor 35, particularly during its dwell period.

From the foregoing it will be seen that my improved turnover means or rotor 35 is simple in construction, as well as unique in that it depends for its actuation solely upon the continuously-moving progressing conveyor 21 of the cooking apparatus and cannot therefore get out of time with said conveyor or foul the barrier bars 34 of the latter. It also follows that the rotor assemblage 35 can be removed as may be required to replace broken spider components 39, 39a, 39b or 39c, and again restored without attendant untiming with regard to the conveyor 21. Upkeep costs, from the standpoint of servicing, are therefore reduced to a minimum. Another advantage of my invention is that it obviates the necessity for two section conveyors and associated parts with separate actuating mechanism for the turnover such as heretofore required. The cooking apparatus can accordingly be manufactured more cheaply and operated at a considerable saving of power.

If desired several of the rotors 35 may be employed in a doughnut cooking apparatus as exemplified in Fig. X of the drawings, wherein three of such rotors are illustrated. As shown, the rotors 35x are spaced at equal distances along the length of the cooking receptacle 10x. By such a duplicated arrangement, the doughnuts D are turned over several times incident to progression through the apparatus with predetermination of even browning through contact alternately of their opposite sides with the cooking liquor L for equal periods.

Having thus described my invention, I claim:

1. In apparatus for cooking doughnuts and the like in hot liquor; a receptacle for the cooking liquor; means with individual cells for progressing the doughnuts in definite separation in the liquor; and means actuated by the cells of the progressing means for turning the doughnuts over in the same cells of the progressing means into which they were initially introduced.

2. In apparatus for cooking doughnuts and the like in hot liquor; a receptacle for the cooking liquor; means with individual cells for progressing the doughnuts in definite separation in the liquor; and rotary means for turning the doughnuts over in the same cells of the progressing means into which they were initially introduced.

3. In apparatus for cooking doughnuts and the like in hot liquor; a receptacle for the cooking liquor; means with individual cells for progressing the doughnuts in definite separation in the liquor; and rotary means actuated by the cells of the progressing means for turning the doughnuts over in the same cells of said progressing means into which they were initially introduced.

4. In apparatus for cooking doughnuts and the like in hot liquor; a receptacle for the cooking liquor; means with individual cells for progressing the doughnuts in definite separation in the cooking liquor; and means actuated through contact with barriers defining the cells of the progressing means to turn the doughnuts over in the same cells into which they were initially introduced.

5. In apparatus for cooking doughnts and the like in hot liquor; a receptacle for the cooking liquor; means with individual cells for progressing the doughnuts in definite separation in the liquor; and a rotor with radial fingers adapted to be actuated through engagement of said fingers successively by the barriers defining the cells of the progressing means to turn over the doughnuts in the respective cells; and means on the rotor to support the doughnuts on edge incident to turning.

6. In apparatus for cooking doughnuts and the like in hot cooking liquor; means with individual cells for progressing the doughnuts in definite separation afloat in the liquor; and means actuated by the cells of the progressing means for engaging the doughnuts from beneath and turning them over in the same cells of the progressing means into which they were initially introduced.

7. In apparatus for cooking doughnuts and the like in hot liquor; a receptacle for the cooking liquor; means with individual cells for progressing the doughnuts in definite separation afloat in the liquor; and rotary means actuated by the cells of the progressing means for successively engaging the doughnuts from beneath and turning them over in the same cells of the progressing means into which they were initially introduced.

8. In apparatus for cooking doughnuts and the like in hot liquor; a receptacle for the cooking liquor, continuously moving means with individual cells for progressing the doughnuts in definite separation in the liquor; and means actuated by the cells of the progressing means for turning the doughnuts over in the same cells of the progressing means into which they were initially introduced.

9. In apparatus for cooking doughnuts and the like in hot liquor; a receptacle for the cooking liquor; continuously moving means with individual cells for progressing the doughnuts in definite separation in the liquor; and means actuated by the cells of the progressing means for turning the doughnuts over in the same cells of said progressing means into which they were initially introduced.

10. In apparatus for cooking doughnuts and the like in hot liquor; a receptacle for the cooking liquor; a continuously moving means with individual cells for progressing the doughnuts in definite separation in the liquor; and a synchronized radially-fingered element rotating by contact of its vanes with the cells of the progressing means for turning the doughnuts over in the same cells of the progressing means into which they were initially introduced.

11. In apparatus for cooking doughnuts and the like in hot liquor; a receptacle for the cooking liquor; a single endless conveyor means with individual cells for progressing the doughnuts in definite separation in the liquor along the length of the receptacle; and means positioned substantially midway of the length of the receptacle and actuated by the cells of the conveying means for turning over the doughnuts in the same cells of the progressing means into which they were initially introduced.

12. In apparatus for cooking doughnuts and the like in hot liquor; a receptacle for the cooking liquor; a single continuously moving endless conveyor with individual cells for progressing the doughnuts in definite separation in the liquor along the length of the receptacle; and a rotor with radial fingers stationed substantially midway of the length of the receptacle and adapted to be continuously actuated through engagement of said fingers successively by the barriers between the cells of the progressing means to turn over the doughnuts in the same cells into which they were initially introduced.

13. In apparatus for cooking doughnuts and the like in hot cooking liquor, a receptacle for the cooking liquor; means with individual cells for progressing the doughnuts in definite separation in the cooking liquor; a freely journaled rotor with radial fingers, adapted to be actuated through engagement of said fingers successively by the barriers defining the cells of the progressing means to turn over the doughnuts in the same cells in which they were initially received and are continuously progressed through the apparatus; and means for yieldingly restraining the rotor to prevent motion thereof independent of the said progressing means.

14. A turnover device useful in connection with apparatus for cooking doughnuts and the like, having the form of a rotor, and comprising a shaft, and a series of counterpart spider-like members aligned on the shaft, in abutting relation, said members having steps with curve-ended radial fingers extending therebeyond that collectively form radial supports for engaging the doughnuts and sustaining them on edge incident to turning them over.

15. In apparatus for cooking doughnuts and the like in hot cooking liquor, a receptacle for the cooking liquor; means with individual cells for progressing the doughnuts in definite separation in the liquor; and means located along the path of progression and actuated by the cells of the progressing means to turn over the doughnuts in the same cells in which they were initially received and are progressed through the apparatus by the progressing means.

16. In apparatus for cooking doughnuts and the like in hot cooking liquor, a receptacle for the cooking liquor; means with individual cells for progressing the doughnuts in definite separation in the liquor; and a multiplicity of turnover means at intervals along the receptacle actuated by the cells of the progressing means to invert the doughnuts in the same cells into which they were initially introduced.

17. In apparatus for cooking doughnuts and the like in hot cooking liquor, a receptacle for the cooking liquor; means for progressing the doughnuts in definite separation in the liquor; and means for individually turning the doughnuts over without changing their position in respect to the progressing means.

18. In apparatus for cooking doughnuts and the like in hot cooking liquor, a receptacle for the cooking liquor; means for progressing the doughnuts in definite separation in the liquor; and means actuated by the progressing means for individually turning the doughnuts over without changing their position in respect to said progressing means.

19. In apparatus for cooking doughnuts and the like in hot cooking liquor, a receptacle for the cooking liquor; means for progressing the doughnuts in definite separation in the liquor; and rotary means actuated by the progressing means for individually turning over the doughnuts without changing their position in respect to the said progressing means.

20. In apparatus for cooking doughnuts and the like in hot cooking liquor, a receptacle for the cooking liquor; means for progressing the doughnuts in definite separation in the liquor; and a multiplicity of devices at intervals along the course of progression for turning individual doughnuts over without changing their position in respect to said progressing means.

21. In apparatus for cooking doughnuts and the like in hot cooking liquor, a receptacle for the cooking liquor; means for progressing the doughnuts in definite separation in the liquor; and means at intervals along the course of progression actuated by the progressing means for turning individual doughnuts over without changing their position in respect to said progressing means.

22. In apparatus for cooking doughnuts and the like in hot liquor; a receptacle for the cooking liquor; means with individual cells for progressing the doughnuts in definite separation in the liquor; and a rotor with radial fingers adapted to be actuated through engagement of said fingers successively by the barriers between the cells of the progressing means to turn over the doughnuts in the same cells into which they were initially introduced.

23. In apparatus for cooking doughnuts and the like in hot cooking liquor; a receptacle for the cooking liquor; continuously moving conveyor means for progressing the doughnuts in definite separation in the liquor; and means for individually turning the doughnuts over without changing their position in the progressing means.

24. In apparatus for cooking doughnuts and the like in hot cooking liquor; a receptacle for the cooking liquor; a single continuously moving conveyor with individual cells for progressing the doughnuts in definite separation in the cooking liquor; and means for individually turning the doughnuts over in the same cells of the progressing means into which they were initially introduced.

25. In apparatus for cooking doughnuts and the like in hot cooking liquor, a receptacle for the cooking liquor; conveyor means for progressing the doughnuts in definite separation in the liquor; and means for individually engaging the doughnuts from beneath and turning them over without changing their position with respect to the progressing means.

26. In apparatus for cooking doughnuts and the like in hot cooking liquor, a receptacle for the cooking liquor; a single, continuously moving conveyor means for progressing the doughnuts in definite separation in the liquor; and means for individually engaging the doughnuts from beneath and turning them over without changing their position in respect to the progressing means.

27. In apparatus for cooking doughnuts and the like in hot cooking liquor, a receptacle for the cooking liquor; a continuously moving conveyor with individual cells for progressing the doughnuts in definite separation in the liquor; and elevating means adapted to enter each individual cell to turn the doughnut over in such cell.

28. In apparatus for cooking doughnuts and the like in hot cooking liquor, a receptacle for the cooking liquor; a single continuously moving conveyor with individual cells for progressing the doughnuts in definite separation in the liquor; and elevating means adapted to enter each cell, and to turn the doughnut over in such cell by lifting it from beneath.

29. A doughnut cooking machine comprising a receptacle for cooking liquid, a doughnut former positioned and operable to deposit doughnuts in the liquid at a predetermined point and at definite intervals, a single, continuously moving conveyor for directing the doughnuts through the machine, and a device located in the course of travel of the doughnuts for turning them over, said device being adapted to turn the doughnuts in the section of the conveyor in which they travel to said turning device.

HERBERT T. HUNTER.